United States Patent
Natarajan et al.

(10) Patent No.: US 9,288,290 B2
(45) Date of Patent: Mar. 15, 2016

(54) INTERACTIVE DYNAMIC ORDERING OF DEEP PACKET INSPECTION RULES

(71) Applicant: Cisco Technology, Inc., San Jose, CA (US)

(72) Inventors: Kadathur Natarajan, Wilmette, IL (US); Prakash Suthar, Naperville, IL (US)

(73) Assignee: Cisco Technology, Inc., San Jose, CA (US)

( * ) Notice: Subject to any disclaimer, the term of this patent is extended or adjusted under 35 U.S.C. 154(b) by 147 days.

(21) Appl. No.: 14/101,672

(22) Filed: Dec. 10, 2013

(65) Prior Publication Data

US 2015/0163328 A1    Jun. 11, 2015

(51) Int. Cl.
*H04L 29/06* (2006.01)
*H04L 12/801* (2013.01)

(52) U.S. Cl.
CPC ............... *H04L 69/22* (2013.01); *H04L 47/34* (2013.01)

(58) Field of Classification Search
None
See application file for complete search history.

(56) References Cited

U.S. PATENT DOCUMENTS

| | | | |
|---|---|---|---|
| 2012/0304250 A1* | 11/2012 | Hu et al. | 726/1 |
| 2013/0212265 A1* | 8/2013 | Rubio Vidales et al. | 709/224 |
| 2014/0016523 A1* | 1/2014 | Sagae et al. | 370/281 |
| 2014/0068102 A1* | 3/2014 | Mann et al. | 709/238 |

OTHER PUBLICATIONS

Grout, et al., "Real-Time Optimisation of Access Control Lists for Efficient Internet Packet Filtering," Journal of Heuristics, vol. 13, No. 5, Oct. 2006, pp. 435-454.
QOSMOS, "Qosmos ixEngine®: DPI and Metadata Engine," Product Datasheet, Aug. 2013, retrieved from http://www.qosmos.com/wp-content/uploads/2013/09/Qosmos-ixEngine-Datasheet-Aug.-2013.pdf, 2 pages.
Misherghi, et al., "A General Framework for Benchmarking Firewall Optimization Techniques," IEEE Transactions on Network and Service Management, vol. 5, No. 4, Dec. 2008, pp. 227-238.

* cited by examiner

*Primary Examiner* — Gary Mui
(74) *Attorney, Agent, or Firm* — Edell, Shapiro & Finnan, LLP (57) ABSTRACT

A network device processes packets transiting the device using successive deep packet inspection (DPI) rules. For each rule, the device attempts to apply the DPI rule to each packet, applies the DPI rule to each packet for which the attempt is successful, determines a probability that the attempt is successful across a plurality of packets, determines an average computational cost of applying the rule across a plurality of packets, and determines a merit of the DPI rule based on the average computational cost and the probability. The device reorders the successive DPI rules in an order of decreasing merit (computational cost), and processes new packets using the optimized DPI rules. The method of re-arranging DPI rules provides significant saving for network devices including mobile gateways in terms of computational cost.

15 Claims, 6 Drawing Sheets

| OPTIMIZED ORDERING OF DPI RULES | | | | | |
|---|---|---|---|---|---|
| R(i) | P(i) | C(i) MICROSECONDS | M(i)=P(i)/C(i)*10000 | CC(i) | EC(i) |
| 3 | 0.12 | 150 | 8.0 | 150 | 18 |
| 9 | 0.12 | 200 | 6.0 | 350 | 42 |
| 8 | 0.08 | 150 | 5.3 | 500 | 40 |
| 7 | 0.12 | 250 | 4.8 | 750 | 90 |
| 10 | 0.08 | 180 | 4.4 | 930 | 74.4 |
| 6 | 0.08 | 200 | 4.0 | 1130 | 90.4 |
| 1 | 0.12 | 400 | 3.0 | 1530 | 183.6 |
| 5 | 0.12 | 500 | 2.4 | 2030 | 243.6 |
| 2 | 0.08 | 500 | 1.6 | 2530 | 202.4 |
| 4 | 0.08 | 800 | 1.0 | 3330 | 266.4 |
| | | | | | 1250.8 |

| INITIAL ORDERING OF DPI RULES | | | | | |
|---|---|---|---|---|---|
| R(i) | P(i) | C(i) MICROSECONDS | M(i)=P(i)/C(i)*10000 | CC(i) | EC(i) |
| 1 | 0.12 | 400 | 3.0 | 400 | 48 |
| 2 | 0.08 | 500 | 1.6 | 900 | 72 |
| 3 | 0.12 | 150 | 8.0 | 1050 | 126 |
| 4 | 0.08 | 800 | 1.0 | 1850 | 148 |
| 5 | 0.12 | 500 | 2.4 | 2350 | 282 |
| 6 | 0.08 | 200 | 4.0 | 2550 | 204 |
| 7 | 0.12 | 250 | 4.8 | 2800 | 336 |
| 8 | 0.08 | 150 | 5.3 | 2950 | 236 |
| 9 | 0.12 | 200 | 6.0 | 3150 | 378 |
| 10 | 0.08 | 180 | 4.4 | 3330 | 266.4 |
| | | | | | 2096.4 |

FIG.4

| OPTIMIZED ORDERING OF DPI RULES | | | | | |
|---|---|---|---|---|---|
| R(i) | P(i) | C(i) MICROSECONDS | M(i)=P(i)/C(i)*10000 | CC(i) | EC(i) |
| 3 | 0.12 | 150 | 8.0 | 150 | 18 |
| 9 | 0.12 | 200 | 6.0 | 350 | 42 |
| 8 | 0.08 | 150 | 5.3 | 500 | 40 |
| 7 | 0.12 | 250 | 4.8 | 750 | 90 |
| 10 | 0.08 | 180 | 4.4 | 930 | 74.4 |
| 6 | 0.08 | 200 | 4.0 | 1130 | 90.4 |
| 1 | 0.12 | 400 | 3.0 | 1530 | 183.6 |
| 5 | 0.12 | 500 | 2.4 | 2030 | 243.6 |
| 2 | 0.08 | 500 | 1.6 | 2530 | 202.4 |
| 4 | 0.08 | 800 | 1.0 | 3330 | 266.4 |
| | | | | | 1250.8 |

INTERACTIVE DYNAMIC ORDERING OF DEEP PACKET INSPECTION RULES

TECHNICAL FIELD

The present disclosure relates to an efficient use of deep packet inspection rules to inspect packets passing through networking equipment.

BACKGROUND

Interconnected networks include many router devices, such as gateways, to route high volumes of Internet traffic in the form of packets among many clients and the networks. The devices may each attempt to perform Deep Packet Inspection (DPI) on the packets transiting the device based on a set of DPI rules, which may include hundreds or even thousands of rules. Some of the DPI rules are complex and as a result require an appreciable amount of device resources, such as processing time and memory, when applied to any given packet. When device resource requirements are multiplied across many packets, many devices, and large sets of DPI rules, the requirements to implement DPI become onerous.

DESCRIPTION OF EXAMPLE EMBODIMENTS

Overview

A technique is provided herein to interactively and dynamically order successive deep packet inspection rules (DPIs) used to inspect packets transiting a network device. The DPI rules are arranged in an initial order. For each DPI rule, the device attempts to apply the DPI rule to each packet, applies the DPI rule to each packet for which the attempt is successful, determines a probability that the attempt is successful across a plurality of packets, determines an average computational cost (e.g., in terms of processor, memory, and other compute resources) of applying the rule across the plurality of packets, and determines a merit of the DPI rule based on the average computational cost and the probability. The device reorders the DPI rules in an order of decreasing merit, and repeats the processing of packets using the reordered DPI rules.

Example Embodiments

There are various situations in a networking environment where it is desirable to perform close inspection of the packets transiting network equipment in the network. One example situation is to monitor types of packets associated with a customer in order to comply with quality of service requirements, or to track traffic flow for billing/charging functions.

In particular, operators of mobile wireless networks, e.g., cellular networks, need to track packet flow to properly bill users of the networks. A gateway router/switch ("gateway") in a mobile core network 50 is provided to route data packets through the network to and from clients 60. Each data packet (also referred to herein simply as a "packet") typically includes one or more Internet Protocol (IP) headers followed by a data payload. The data payload may convey a variety of different types of data content, such as voice, text, and image/video content. The content may be associated with any number of different applications, including user applications and service applications, such as fee-for-service applications used by service providers.

The gateway, or other network device, performs packet inspection on the packets based on a set of inspection rules. The gateway may implement different types of packet inspection, including, for example, shallow packet inspection and deep packet inspection (DPI). Shallow packet inspection involves shallow inspection rules that examine the protocol headers of a packet, such as the IP and Transmission Control Protocol (TCP) headers. Shallow inspection rules typically operate at Open System Interconnection (OSI) layers 3 and 4. DPI involves application of rules that also examine deeper portions of the packet, including the contents of the data payload. DPI rules may examine the packet at OSI layer 7. DPI is used by providers of network services to examine protocol headers and payload content for a variety of purposes, such as to generate billing and/or service usage records, as explained above.

DPI processing of a given packet using DPI rules includes attempting to apply each rule to the packet in a sequential order in which the rules are arranged, stored or maintained. If an attempt on a given rule is unsuccessful, the next rule in line is attempted. That is, the processing attempts to apply a first rule to the packet, then a second rule, then a third rule, and so on, in the sequential order, until an attempt is successful, i.e., the rule passes (or matches). If an attempt is successful, then that rule is fully applied, i.e., the rule examines the protocol headers and data content in the packet payload in accordance with whatever examination function the rule implements.

Some DPI rules are more likely to match packets than others (i.e., some DPI rules are more likely to be successfully applied to packets) and, depending on the level of packet examination and functional complexity of the rule, some rules may take longer to process/execute than others. The time to apply a set of DPI rules is the total time taken to test the packet against the DPI rules and to fully execute the matching rule(s). Given the high data bandwidths involved with network traffic and the large number of DPI rules that may need to be applied in a given set of rules, it is advantageous to order the DPI rules in such a way as to minimize, or at least reduce, the average time it takes to process packets using those rules. Because the content conveyed by the packets will vary over time, so to will the time to apply a set of DPI rules to the packets in a given order vary. Therefore, it is advantageous to reorder the DPI rules dynamically to compensate for such packet variance. While DPI rules may be reordered according to techniques that improve rule execution efficiency automatically, i.e., in the absence of any user control, it is often advantageous to convey statistics indicating an execution efficiency associated with a given rule order, and to permit a user to control whether DPI rules should be reordered based on those statistics. Accordingly, techniques are provided herein to order DPI rules in order to increase efficiency in a dynamic and interactive manner, as described below.

Figure 1:
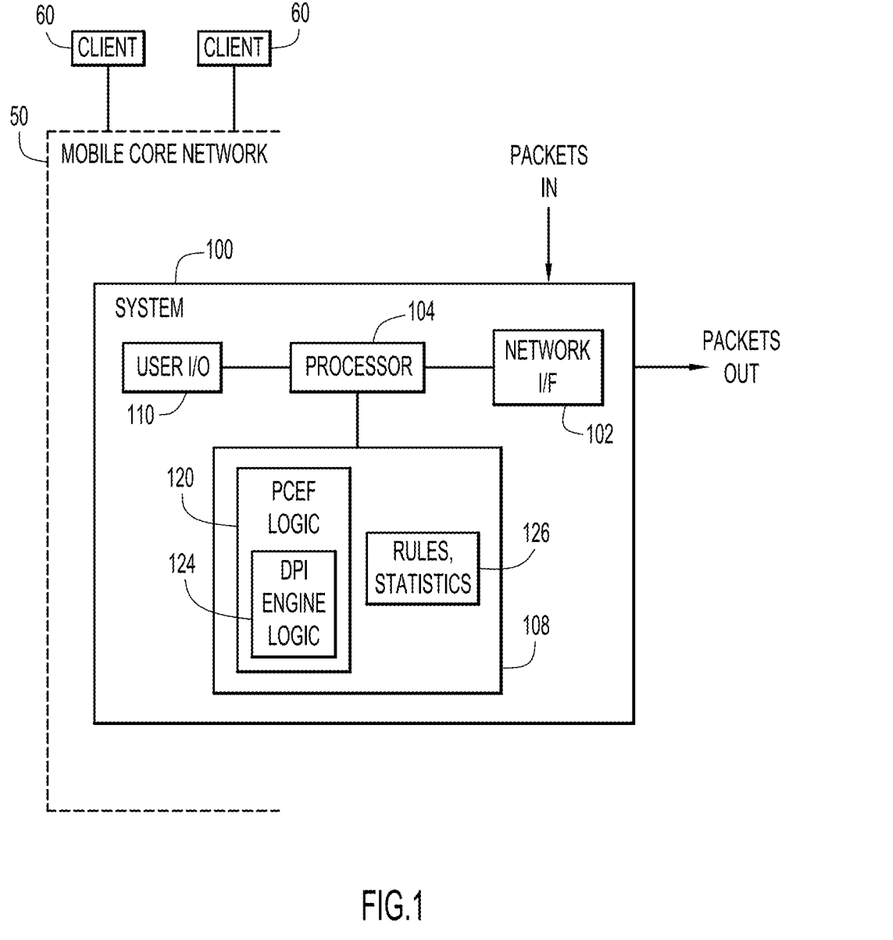
FIG. 1 is a block diagram of an example system configured to perform interactive, dynamic ordering of Deep Packet Inspection (DPI) rules to maximize rule processing efficiency.

Referring first to FIG. 1, there is shown a block diagram of an example system or apparatus 100 (e.g., a network device) configured to perform interactive, dynamic ordering of DPI rules to maximize rule processing efficiency. There are numerous possible configurations for system 100 and FIG. 1 is meant to be an example. System 100 may reside in a gateway, for example. System 100 includes a network interface unit 102, a processor 104, memory 108, and a user Input/Output module 110 used in association with a Graphical User Interface (GUI) to enable a user to interface with and control the system 100. The network interface (I/F) unit 102 is, for example, an Ethernet card device that allows the system 100 to communicate over a network, e.g., a wired (Ethernet) network. Network I/F 102 may also include wireless connection capability. The processor 104 is a microcontroller or microprocessor, for example, configured to execute software instructions stored in the memory 108.

The memory 108 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 108 may comprise one or more computer readable storage media (e.g., a memory device) encoded with software comprising computer executable instructions and when the software is executed (by the processor 104) it is operable to perform the operations described herein. For example, the memory 108 stores or is encoded with instructions for Policy Control and Enforcement Function (PCEF) Logic 120 to perform generalized PCEF functions on system 100. PCEF logic 120 includes DPI Engine logic 124 to perform (i) DPI based on a set of DPI rules, and (ii) interactive, dynamic ordering of the DPI rules. DPI Engine logic 124 may also include GUI logic to support GUI-related operations as described herein. In addition, memory 208 stores DPI rules and various DPI-related statistics 126 generated and used by DPI Engine logic 124.

Figure 2:
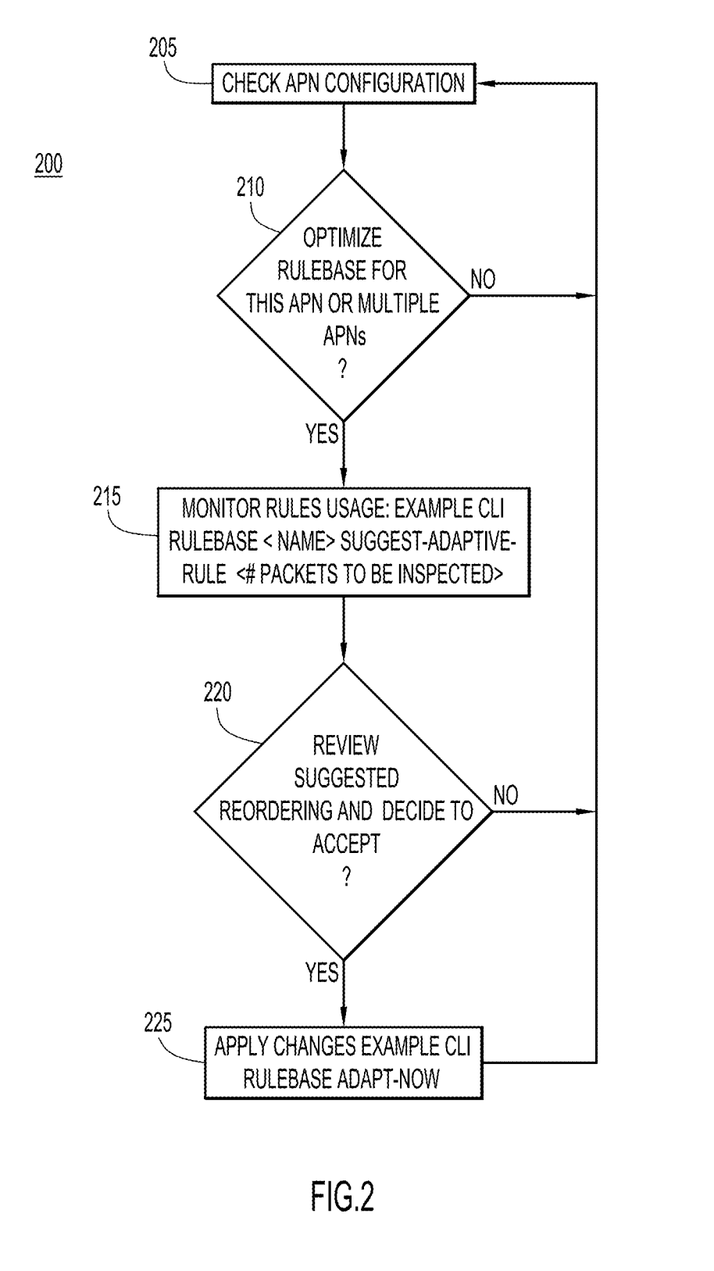
FIG. 2 is a flowchart of an example method of interactively and dynamically ordering DPI rules performed by the system of FIG. 1.

With reference to FIG. 2, there is depicted a flowchart of an example method 200 of interactively and dynamically ordering DPI rules that is performed by logic 124 in system 100.

At 205, logic 124 accesses an access point name (APN) associated with, e.g., the gateway in which logic 124 resides. The APN identifies the part of a network where a user session is established, e.g., at a wireless access point (AP). The APN provides an index to associated current configuration information. The current configuration information indicates a set of DPI rules (referred to as a "rulebase" in FIG. 2) associated with the APN/gateway. The DPI rules are successive rules arranged in a given or initial order and that are to be applied to packets transiting the gateway.

At 210, via a GUI, logic 124 displays the APN and a name of the rulebase indicated at 205, and also prompts a user to select whether to perform dynamic ordering of the indicated rulebase. If multiple APNs and corresponding rulebases were identified at 205, the user may select from among the multiple associated rulebases. If the user selects NO (i.e., not to perform dynamic ordering), flow returns to 205. If the user selects YES, then flow proceeds to 215.

At 215, system 100 performs dynamic ordering (referred to as "DPI rule order monitoring" in FIG. 2) in accordance with techniques provided herein (and described in detail below).

The dynamic ordering may be invoked by a command identifying the name of the rulebase from 210 that is to be optimized and a number of packets over which the optimization is to be performed, i.e., the number of packets to be inspected. In an example, the command may be a command-line-interface (CLI) command, such as: "Rulebase <NAME> suggest-adaptive-rule <# packets to be inspected>." The user may enter the command via the GUI. Another variation would enable the user to ask the DPI engine to suggest an adaptive ordering of rules at any time instant in the history of execution of the DPI engine and subsequently either accept or reject the suggestion at the discretion of the user. When the DPI engine adapts its execution based on acceptance of the revised rule ordering by the user, the DPI engine will reset the counters and cost information for the rules and start to gather performance statistics over again.

The dynamic rule ordering invoked at 215 generates (i) statistics that indicate efficiency-based merit of the given/initial order of the DPI rules, and (ii) a proposed new order of the DPI rules (i.e., a reordering of the DPI rules) along with associated statistics that indicate an efficiency-based merit of the proposed new order. Generally, the proposed new order increases rule execution efficiency relative to the given/initial order.

A summary of the technique used to generate statistics and a proposed new order of rules in operation 215 is now described.

Let there be N successive DPI rules $R(1), R(2), \ldots, R(N)$ ordered according to the given sequence ($R(1)$-$R(N)$). The descriptor $R(i)$ denotes a given DPI rule. The number of DPI rules N may be in the hundreds or even thousands.

Logic 124 attempts to apply the DPI rules $R(1)$ to $R(N)$ successively in the given order to each packet among the number of packets to be processed using the DPI rules. For example, an attempt to apply $R(1)$ to a packet is made, then an attempt to apply $R(2)$ to the packet is made, and so on. If the attempt to apply a given DPI rule $R(i)$ is successful, i.e., a match occurs, then the DPI rule $R(i)$ is applied, i.e., fully executed.

Over time, as the number of packets are processed using the successive DPI rules $R(1)$ to $R(N)$ in that order, the following statistics are generated for each DPI rule $R(i)$:

a. $A(i)$=Number of times the DPI rule ($R(i)$) is attempted across the packets;
b. $S(i)$=Number of times the attempt to apply the DPI rule was successful across the packets, i.e., the number of times the DPI rule matched;
c. $P(i)=A(i)/S(i)$=Probability that the attempt to apply the DPI rule is successful across the many packets;
d. $C(i)$=Average computational cost of applying the DPI rule. $C(i)$ is a running average based on all prior attempts to apply (and actually apply) the DPI Rule. The computational cost includes an average processing time to apply the DPI rule, i.e., to fully execute the DPI rule. The computational cost may be based on criteria such as a number of central processor units (CPU) used to process the DPI rules, a processor speed, and a number of processor threads used in the processing;
e. $M(i)=(P(i)/C(i))\times NF$=Merit for applying the DPI rule. Merit $M(i)$ is proportional to a ratio of the Probability $P(i)$ to the Cost $C(i)$. NF is a normalizing factor, such as 1,000. Merit $M(i)$ is higher for (i.e., favors) DPI rules that have a higher probability of being applied and a lower computational cost than for DPI rules that have a lower probability of being applied and a higher computation cost.

f. CC(i)=Cumulative Cost for applying the DPI rule. The Cumulative Cost is a summation of the average computational costs C(i), C(i−1), C(i−2), C(i−3) and so on, for the DPI rule and all preceding DPI rules leading up to the DPI rule; and g. EC(i)=Expected Cost contributed by execution of the DPI rule. EC(i) is the product of the Cumulative Cost C(i) of the DPI rule and the probability P(i) for the DPI rule. A gain in computational efficiency is realized if the DPI rules are ordered such that a successful attempt to apply a given one of the DPI rules with a lower computational cost occurs earlier in the ordered list of successive DPI rules.

In operation 215, after processing the specified number of packets through the DPI rules and generating the statistics listed above, a new order for DPI rules R(1) to R(N) is proposed. Specifically, the DPI rules are reordered in an order of decreasing Merit C(i), so that DPI rules with higher Merit M would be attempted before DPI rules with lower Merit M. Also, new Cumulative Costs CC and Expective Costs EC are generated for the proposed DPI rules as reordered. A total Expected Costs for all of the DPI rules is also computed.

Returning again to the flow in FIG. 2, at 220, via the GUI, logic 124 displays the statistics and proposed new order of the DPI rules generated at 215, and prompts the user to select whether to reorder the DPI rules as proposed, i.e., whether to use the DPI rules as reordered. If the user selects NO, flow returns to 205 and the above described process repeats using the DPI rules in their original order. If the user selects YES, the reordered DPI rules (i.e., the adapted rulebase) are adopted, and flow returns to 205 and the process repeats using the reordered DPI rules. Adoption of the reordered DPI rules may be invoked using a command, which may be entered through the GUI. An example would be a CLI command "rulebase adapt-now." In another embodiment, the user may select an option to perform automatic reordering without user intervention.

Figure 3:
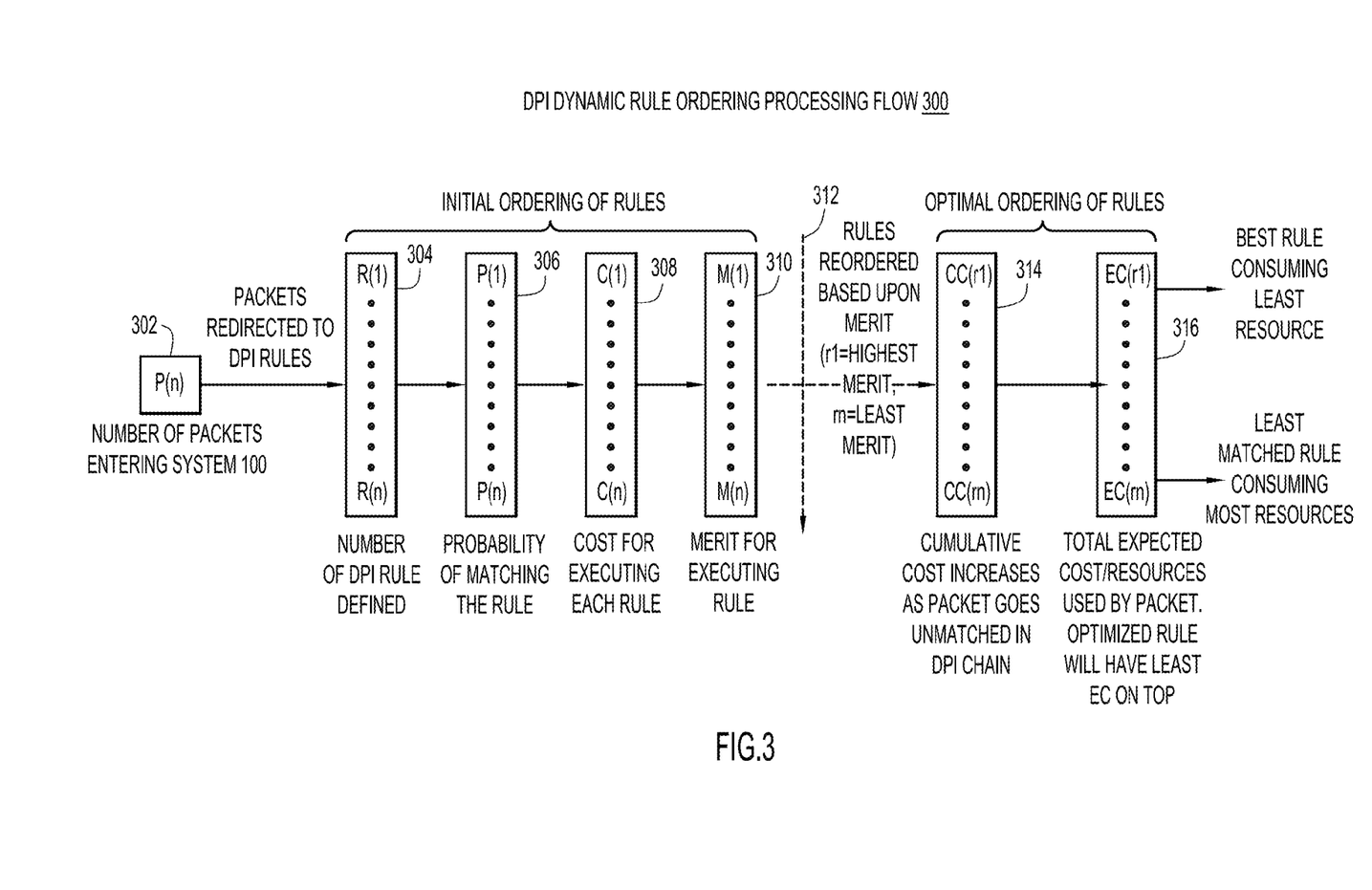
FIG. 3 is a processing flow diagram for rule ordering operations performed in the method of FIG. 2.

With reference to FIG. 3, there is shown an example rule ordering processing flow diagram for operation 215 described above.

At 302, a number of packets P(n) received by system 100 are directed to DPI engine logic 124. At 304, each packet is processed through successive DPI rules R(1) to R(N). At 306, logic 124 computes Probability P(i) for each DPI rule R(i). At 308, logic 124 computes Cost C(i) for each DPI rule R(i). At 310, logic 124 computes Merit M(i) for each DPI rule R(i). Also, logic 124 computes both Cumulative Cost CC(i) and Expected Cost EC(i) for each DPI rule R(i) (neither CC(i) nor EC(i) are shown in FIG. 3). At 312, logic 124 reorders the rules R(1) to R(N) in an order of decreasing merit M, to produce reordered rules R(ri) to R(rn) (not shown in FIG. 3). At 314, logic 124 computes Cumulative Cost CC(ri) for each DPI rule R(ri). As stated in FIG. 3, the Cumulative Cost increases as packet goes unmatched in the DPI rule chain.

At 316, logic 124 computes Expected Cost EC(ri) for each DPI rule R(ri). The total expected cost reflects the amount of resources used to apply the DPI rules to a packet. EC(rl) reflects the best rule consuming the least amount of resources. The optimized rule will have the least EC, i.e., EC(rl). Conversely, EC(rn) reflects the least matched rule consuming the most resources.

An example in which ten DPI rules R(1) to R(10) are reordered from an initial order to a new order based on processing of a number of packets is now described in connection with FIGS. 4 and 5.

Figure 4:
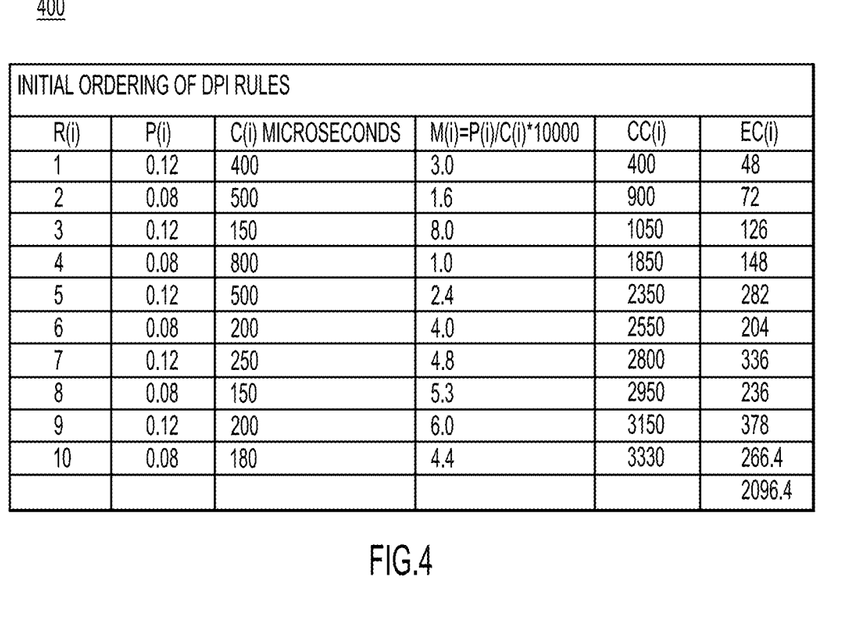
FIG. 4 is a table listing efficiency-based statistics for an example set of DPI rules listed in an initial rule order.

With reference to FIG. 4, a table 400 lists the ten DPI rules (R(i), where i=1 to l=10) arranged in an initial successively increasing order of i=1 to i=10 from top to bottom of a first column of table 400. For each DPI rule R(i), successive columns of table 400 list the following statistics resulting from processing the number of packets with the DPI rules: Probability P(i); Cost C(i); Merit M(i); Cumulative Cost CC(i); and Expected Cost EC(i). A total Expected Cost of 2096.4 is also listed at the bottom of a last column of table 400.

Figure 5:
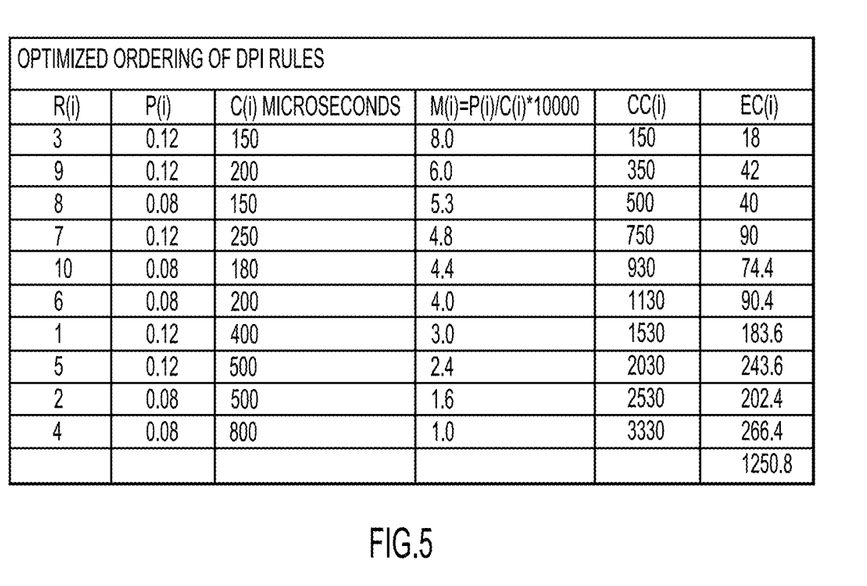
FIG. 5 is a table listing efficiency-based statistics for the example set of rules of FIG. 4, but in a revised rule order.

With reference FIG. 5, a table 500 lists the ten DPI rules of table 400 rearranged in an order of decreasing Merit M indicated in table 400. A total Expected Cost of 1250.8 is also listed at the end of the last column of table 500. The reordered DPI rules in table 500 reduce the total Expected Cost from 2096.4 (from table 4) down to 1250.8. The initial ordering of FIG. 4 is sub-optimal. It is 1.676 times the optimal cost of execution.

Thus, FIGS. 4 and 5 show that the total Expected Cost of applying the DPI rules can be greatly improved if the DPI rules can be reordered in a way to find matches faster using the least amount of resources. Furthermore, the data shown in the tables of FIGS. 4 and 5 may be displayed to a user. That is, statistics may be displayed for each of the DPI rules, including at least the merits, the cumulative costs, and the expected costs, as well as a list of the DPI rules as recorded. A user may thereafter be prompted to select whether to use the reordered DPI rules.

Figure 6:
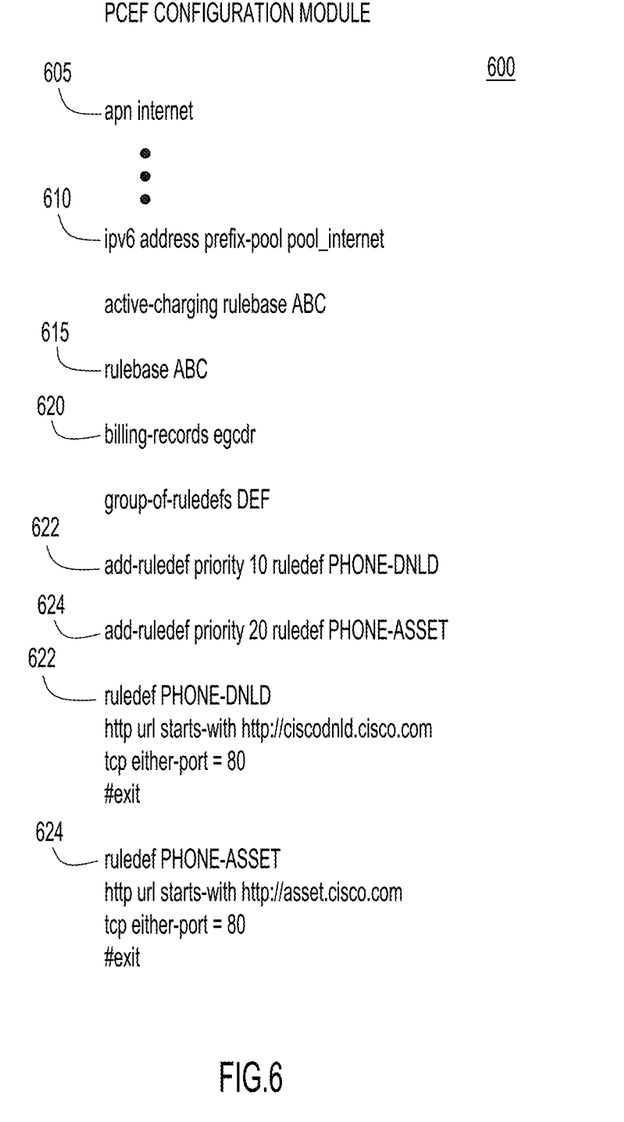
FIG. 6 is an example Policy Control and Enforcement Function (PCEF) Configuration Command Module executed by PCEF logic and DPI engine logic in the system of FIG. 1.

With reference to FIG. 6, there is depicted an example PCEF Configuration Command Module 600 executed by PCEF logic 120 and DPI engine logic 124. Configuration Command Module 600 sets forth DPI rules for inspecting/examining packets, e.g., Hypertext Transfer Protocol (HTTP) formatted packets. Module 600 includes a module name 605 ("APN Internet") and an IP protocol descriptor 610. At 615, module 600 references a DPI rulebase "ABC" by name and that is defined later in the module. At 620, module 600 indicates that rulebase ABC generates billing records for packets that match rules in the rulebase. Rulebase ABC defines two DPI rules 622, 624, namely, "PHONE-DNLD," PHONE-ASSET."

An attempt to apply DPI rule 622 to a packet will be successful and a billing record will be generated if the packet includes a reference to Uniform Resource Locator (URL) http://ciscodnld.cisco.com and is associated with a TCP port 80 of a gateway. Similarly, an attempt to apply DPI rule 624 to a packet will be successful if the packet includes a reference to Uniform Resource Locator (URL) http://asset.cisco.com and is associated with the TCP port 80. If successful, DPI rules 622, 624 each generate billing records associated with accessing content at the respective URLs referenced in the rules. DPI rules 622, 624 are considered DPI rules that operate at OSI layer 7 at least in part because alphanumeric/textual URLs must be examined in the packet. FIG. 6 is meant to be an example of the types of DPI rules that may be defined in a rulebase and reordered according to the techniques presented here.

Figure 7:
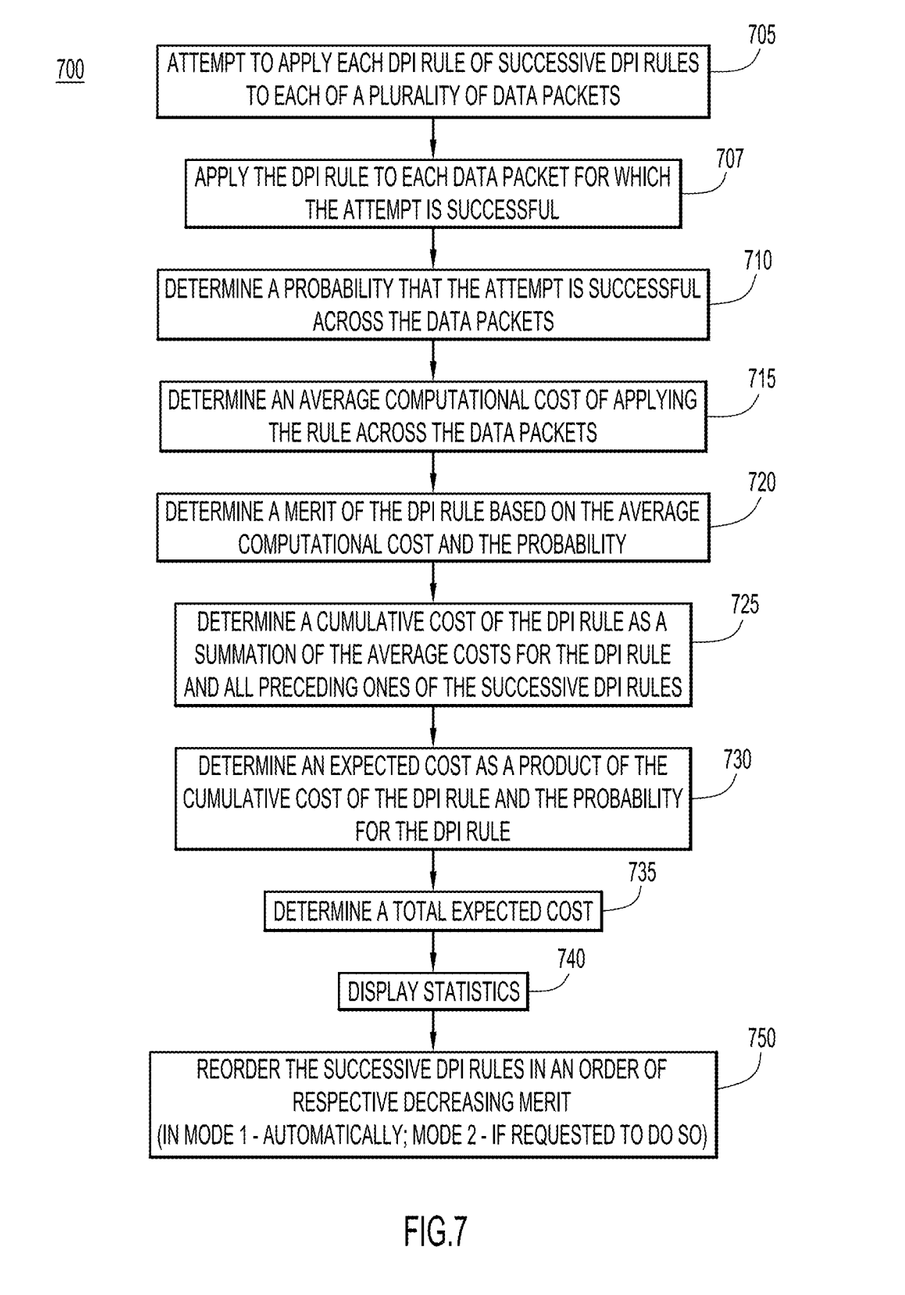
FIG. 7 is a generalized flowchart of a method for dynamic ordering of DPI rules according to the techniques presented herein.

FIG. 7 is a flowchart of a method 700 that generalizes the dynamic reordering of DPI rules according to techniques described above.

At 705, an attempt is made to apply each DPI rule of successive DPI rules arranged in a given/initial order to each of a plurality of packets. For each DPI rule several operations are performed:

a. 707 includes applying the DPI rule to each packet for which the attempt is successful;

b. 710 includes determining a probability that the attempt is successful across the packets;

c. 715 includes determining an average computational cost of applying the rule across the packets;

d. 720 includes determining a merit of the DPI rule based on the average computational cost and the probability;

e. 725 includes determining a cumulative cost of the DPI rule as a summation of the average costs for the DPI rule and all preceding ones of the successive DPI rules; and f. 730 includes determining an expected cost as a product of the cumulative cost of the DPI rule and the probability for the DPI rule.

At 735, a determination is made of a total expected cost accumulated across all of the DPI rules. At 740, the statistics determined above are displayed, e.g., at least the cumulative costs and the expected costs. At 750, reordering of the successive DPI rules is made in an order of respective decreasing merit. This may be done automatically, or in response to a user prompt to perform the reordering. Method 700 is repeated using the reordered DPI rules.

As DPI rules are added or deleted, the optimal ordering may change. By following the dynamic mechanisms described herein, the DPI rules can be executed in an optimal sequence. Any ad hoc constraints on rule order can be enforced using interactive mechanisms.

There are some additional factors that may be built into this process. A default rule may be considered as always matching, if none of the specified rules match for a packet subject to deep packet inspection. For such a default rule, the probability of success will be 1 and the cost of execution is 0. If all rules are reordered according to the techniques presented herein, it is possible that the default rule may be applied first. However, this can be prevented by configuring the DPI engine to not include the default rule in the rule ordering process.

As described herein, a technique is provided to interactively and dynamically ordering DPI rules based on processing of data packets by the rules. The technique dynamically reorders the DPI rules to improve a computational efficiency with which the rules are applied. Rules that are more likely to be successfully applied to packets and have a lower computational cost when applied are favored (and moved up in the order of application) overrules that are less likely to be successfully applied and that have a higher computational cost. The technique does not require an a priori knowledge of packet content and adapts as packet content changes. The technique generates efficiency statistics and displays them to a user. The user may interactively select to invoke rule ordering based on the displayed statistics. The technique reorders DPI rules that examine packets at OSI layer 7.

The techniques presented herein may be embodied in a physical network device or element, or in a virtual network device or element (i.e., in a software process that performs networking operations on packets).

In summary, in one form, a method is provided, comprising: processing packets transiting a network element using successive deep packet inspection (DPI) rules arranged in a given order, the processing including, for each rule: attempting to apply the DPI rule to each packet; applying the DPI rule to each data packet for which the attempt is successful; determining a probability that the attempt is successful across a plurality of packets; determining an average computational cost of applying the rule across a plurality of packets; and determining a merit of the DPI rule based on the average computational cost and the probability; reordering the successive DPI rules in an order of decreasing merit; and repeating the processing using the reordered DPI rules.

In another form, an apparatus is provided, comprising: a network interface unit configured to send and receive packets to and from a network; and a processor coupled to the network interface unit, and configured to: process the packets using successive deep packet inspection (DPI) rules arranged in a given order, wherein the processor is configured to, for each rule: attempt to apply the DPI rule to each packet; apply the DPI rule to each data packet for which the attempt is successful; determine a probability that the attempt is successful across a plurality of packets; determine an average computational cost of applying the rule across a plurality of packets; and determine a merit of the DPI rule based on the average computational cost and the probability; reorder the successive DPI rules in an order of decreasing merit; and repeat the processing of packets using the reordered DPI rules.

In still another form, a processor readable medium is provided for storing instructions that, when executed by a processor, cause the processor to: process packets transiting a network device using successive deep packet inspection (DPI) rules arranged in a given order, wherein the processor is configured to, for each rule: attempt to apply the DPI rule to each packet; apply the DPI rule to each data packet for which the attempt is successful; determine a probability that the attempt is successful across a plurality of packets; determine an average computational cost of applying the rule across a plurality of packets; and determine a merit of the DPI rule based on the average computational cost and the probability; reorder the successive DPI rules in an order of decreasing merit; and repeat the processing of packets using the reordered DPI rules.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
   processing packets transiting a network device using successive deep packet inspection (DPI) rules arranged in a given order, the processing including, for each rule:
   attempting to apply the DPI rule to each packet;
   applying the DPI rule to each packet for which the attempt is successful;
   determining a probability that the attempt is successful across a plurality of packets;
   determining an average computational cost of applying the DPI rule across a plurality of packets; and
   determining a merit of the DPI rule that is proportional to a ratio of the probability to the average computational cost;
   determining, based on the computational costs and the probabilities for each DPI rule, a total expected cost that indicates a computational efficiency of the given order;
   reordering the successive DPI rules in an order of decreasing merit so as to decrease the total expected cost;
   displaying statistics for each of the DPI rules and a list of the DPI rules as reordered according to the reordering;
   prompting a user to select whether to use the reordered DPI rules;
   if the user selects to use the reordered DPI rules, repeating the processing using the reordered DPI rules; and
   if the user selects not to use the reordered DPI rules, repeating the processing using the DPI rules in the given order.

2. The method of claim 1, wherein the packet includes one or more protocol headers and a data payload, and the applying the DPI rule includes examining contents of the data payload and making a decision based on the examination of the contents.

3. The method of claim 1, further comprising:
for each DPI rule, determining a cumulative cost of the DPI rule as a summation of the average computational costs for the DPI rule and for each preceding DPI rule in a current ordering of the DPI rules.

4. The method of claim 3, further comprising:
for each DPI rule, determining an expected cost based on a product of the cumulative cost of the DPI rule and the probability for the DPI rule; and
determining the total expected cost as a summation of the expected costs for all of the DPI rules.

5. The method of claim 4, wherein:
the displaying the statistics for each of the DPI rules includes displaying at least the merits, the cumulative costs, the expected costs, and the total expected cost.

6. An apparatus comprising:
a network interface unit configured to send and receive packets to and from a network; and
a processor coupled to the network interface unit, and configured to:
process the packets using successive deep packet inspection (DPI) rules arranged in a given order, wherein the processor is configured to, for each rule:
attempt to apply the DPI rule to each packet;
apply the DPI rule to each packet for which the attempt is successful;
determine a probability that the attempt is successful across a plurality of packets;
determine an average computational cost of applying the DPI rule across a plurality of packets; and
determine a merit of the DPI rule that is proportional to a ratio of the probability to the average computational cost;
determine, based on the computational costs and the probabilities for each DPI rule, a total expected cost that indicates a computational efficiency of the given order;
reorder the successive DPI rules in an order of decreasing merit so as to decrease the total expected cost;
display statistics for each of the DPI rules and a list of the DPI rules as reordered according to the reorder operation;
prompt a user to select whether to use the reordered DPI rules;
if the user selects to use the reordered DPI rules, repeat the process operation using the reordered DPI rules; and
if the user selects not to use the reordered DPI rules, repeat the process operation using the DPI rules in the given order.

7. The apparatus of claim 6, wherein the packet includes one or more protocol headers and a data payload, and the processor is configured to apply by examining contents of the data payload and making a decision based on the examination of the contents.

8. The apparatus of claim 6, wherein the processor is further configured to:
for each DPI rule, determine a cumulative cost of the DPI rule as a summation of the average computational costs for the DPI rule and for each preceding DPI rule in a current ordering of the DPI rules.

9. The apparatus of claim 8, wherein the processor is further configured to:

for each DPI rule, determine an expected cost based on a product of the cumulative cost of the DPI rule and the probability for the DPI rule; and
determine the total expected cost as a summation of the expected costs for all of the DPI rules.

10. The apparatus of claim 9, wherein the processor is further configured to:
display the statistics for each of the DPI rules, including at least the merits, the cumulative costs, the expected costs, and the total expected cost.

11. A tangible processor readable medium storing instructions that, when executed by a processor, cause the processor to:
process packets transiting a network device using successive deep packet inspection (DPI) rules arranged in a given order, wherein the processor is configured to, for each rule:
attempt to apply the DPI rule to each packet;
apply the DPI rule to each packet for which the attempt is successful;
determine a probability that the attempt is successful across a plurality of packets;
determine an average computational cost of applying the DPI rule across a plurality of packets; and
determine a merit of the DPI rule that is proportional to a ratio of the probability to the average computational cost;
determine, based on the computational costs and the probabilities for each DPI rule, a total expected cost that indicates a computational efficiency of the given order; and
reorder the successive DPI rules in an order of decreasing merit so as to decrease the total expected cost;
display statistics for each of the DPI rules and a list of the DPI rules as reordered according to the reorder operation;
prompt a user to select whether to use the reordered DPI rules;
if the user selects to use the reordered DPI rules, repeat the process operation using the reordered DPI rules; and
if the user selects not to use the reordered DPI rules, repeat the process operation using the DPI rules in the given order.

12. The processor readable medium of claim 11, wherein the packet includes one or more protocol headers and a data payload, and wherein the instructions comprise instructions to cause the processor to examine contents of the data payload and make a decision based on the examination of the contents.

13. The processor readable medium of claim 11, further comprising instructions to cause the processor to:
for each DPI rule, determine a cumulative cost of the DPI rule as a summation of the average computational costs for the DPI rule and for each preceding DPI rule in a current ordering of the DPI rules.

14. The processor readable medium of claim 13, further comprising instructions to cause the processor to:
for each DPI rule, determine an expected cost based on a product of the cumulative cost of the DPI rule and the probability for the DPI rule; and
determine the total expected cost as a summation of the expected costs for all of the DPI rules.

15. The processor readable medium of claim 14, wherein the instructions to cause the processor to display include instructions to cause the processor to:

display the statistics for each of the DPI rules, including at least the merits, the cumulative costs, the expected costs, and the total expected cost.

* * * * *